(12) United States Patent
Reefman (10) Patent No.: US 7,325,131 B2
(45) Date of Patent: Jan. 29, 2008

(54) ROBUST WATERMARK FOR DSD SIGNALS

(75) Inventor: Derk Reefman, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 798 days.

(21) Appl. No.: 10/235,439

(22) Filed: Sep. 5, 2002

(65) Prior Publication Data

US 2003/0079131 A1  Apr. 24, 2003

(30) Foreign Application Priority Data

Sep. 5, 2001 (EP) .................................. 01203349

(51) Int. Cl.
*H04L 9/00* (2006.01)
*H04N 7/167* (2006.01)
*H04L 9/32* (2006.01)

(52) U.S. Cl. ..................... 713/167; 380/229; 726/26

(58) Field of Classification Search ............... 713/167; 380/229; 726/26
See application file for complete search history.

(56) References Cited

U.S. PATENT DOCUMENTS

| | | | | |
|---|---|---|---|---|
| 5,848,155 A * | 12/1998 | Cox | ............................ | 382/191 |
| 5,889,868 A * | 3/1999 | Moskowitz et al. | ......... | 713/176 |
| 5,930,369 A * | 7/1999 | Cox et al. | ....................... | 380/54 |
| 6,061,793 A * | 5/2000 | Tewfik et al. | ................ | 713/176 |
| 6,157,330 A | 12/2000 | Bruckers et al. | ............. | 341/143 |
| 6,209,092 B1 * | 3/2001 | Linnartz | ...................... | 713/176 |
| 6,314,518 B1 * | 11/2001 | Linnartz | ...................... | 713/176 |
| 6,330,672 B1 * | 12/2001 | Shur | ............................. | 713/176 |
| 6,330,673 B1 * | 12/2001 | Levine | ......................... | 713/176 |
| 6,345,100 B1 * | 2/2002 | Levine | ......................... | 380/205 |
| 6,442,285 B2 * | 8/2002 | Rhoads et al. | .............. | 382/100 |
| 6,522,767 B1 * | 2/2003 | Moskowitz et al. | ......... | 382/100 |
| 6,522,769 B1 * | 2/2003 | Rhoads et al. | .............. | 382/100 |
| 6,674,861 B1 * | 1/2004 | Xu et al. | ...................... | 380/252 |
| 6,674,876 B1 * | 1/2004 | Hannigan et al. | ............ | 382/100 |
| 6,690,812 B2 * | 2/2004 | Reefman et al. | ............. | 382/100 |
| 6,718,047 B2 * | 4/2004 | Rhoads | ........................ | 382/100 |
| 6,724,911 B1 * | 4/2004 | Cox et al. | .................... | 382/100 |
| 6,810,388 B1 * | 10/2004 | Sato | ............................. | 705/57 |
| 6,850,619 B1 * | 2/2005 | Hirai | ........................... | 382/100 |
| 6,853,676 B2 * | 2/2005 | Kim | ............................. | 375/130 |
| 6,891,958 B2 * | 5/2005 | Kirovski et al. | ............. | 382/100 |
| 6,996,521 B2 * | 2/2006 | Iliev et al. | ................... | 704/200 |
| 7,000,113 B1 * | 2/2006 | Linnartz | ...................... | 713/176 |
| 2001/0029580 A1 * | 10/2001 | Moskowitz | .................. | 713/176 |
| 2002/0001277 A1 * | 1/2002 | Thomas | .................... | 369/59.21 |

(Continued)

OTHER PUBLICATIONS

Anonymous: "Super Audio Compact Disc—A Technical Proposal" Internet Article, 'Online! 1997, XP002186479, pp. 1-12.

*Primary Examiner*—Gilberto Barron, Jr.
*Assistant Examiner*—Virgil Herring (57) ABSTRACT

A robust watermark embedded into a Direct Stream Digital (DSD) audio signal including a flat frequency response in a specific frequency range which does not extend below 20 kHz or above 100 kHz. The watermark is therefore hidden in the noise spectrum of the DSD signal, such that the watermark is inaudible to a listener. Since the noise spectrum contains important information that helps provide the DSD signals with sharp transients and an accurate impulse response, the watermark cannot be removed from the DSD signal without causing significant degradation to the signal's audio quality.

8 Claims, 6 Drawing Sheets

U.S. PATENT DOCUMENTS

| | | | |
|---|---|---|---|
| 2002/0146147 A1* | 10/2002 | Levy | 382/100 |
| 2002/0146148 A1* | 10/2002 | Levy | 382/100 |
| 2003/0046238 A1* | 3/2003 | Nonaka et al. | 705/51 |
| 2003/0108200 A1* | 6/2003 | Sako | 380/201 |
| 2003/0172277 A1* | 9/2003 | Suzuki et al. | 713/176 |
| 2004/0006696 A1* | 1/2004 | Shin et al. | 713/176 |
| 2004/0015711 A1* | 1/2004 | Ogura | 713/193 |
| 2004/0024588 A1* | 2/2004 | Watson et al. | 704/200.1 |

* cited by examiner

ROBUST WATERMARK FOR DSD SIGNALS

BACKGROUND OF THE INVENTION

1. Field of the Invention

The present invention relates generally to the protection of intellectual property, and more specifically, to a robust digital watermark that is encoded into a Direct Stream Digital (DSD) signal.

2. Description of the Related Art

When the compact disk (CD) was first developed, Pulse Coding Modulation (PCM) was the best available technology for encoding a digital audio signal to be recorded on a disk. The standard CD format has a 16-bit resolution and sampling frequency of 44.1 kHz.

As a result of advances made in professional recording techniques, the resolution and sampling rate of the standard CD format is no longer adequate to preserve the audio quality of the recordings being made at various digital studios.

Figure 1A:
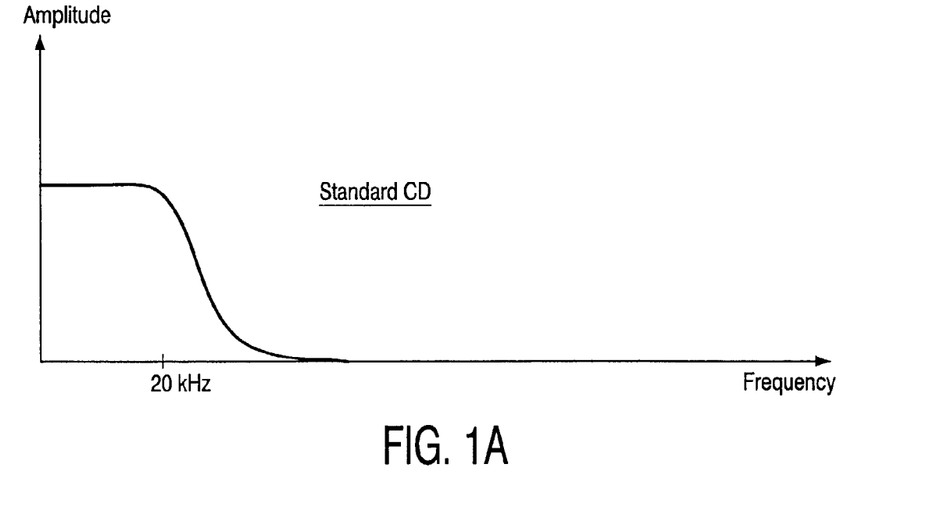
FIG. 1A illustrates the typical audio spectrum of a standard CD signal.

FIG. 1A illustrates the typical audio spectrum of the standard CD signal. As shown in this figure, the signal band of standard CD strongly diminishes after 20 kHz.

Super Audio Compact Disk is a high-resolution audio CD format, which utilizes Direct Stream Digital (DSD®), instead of PCM, for recording audio signals. The DSD recording format directly records the 1-bit signal, output from a sigma-delta analog-to-digital (A/D) converter at a sampling rate of 2.8224 MHz. The sigma-delta A/D converters used in DSD include noise shaping filters to effectively shift the noise out of the audio band, i.e., shift the noise well above 20 kHz where it is inaudible.

Figure 1B:
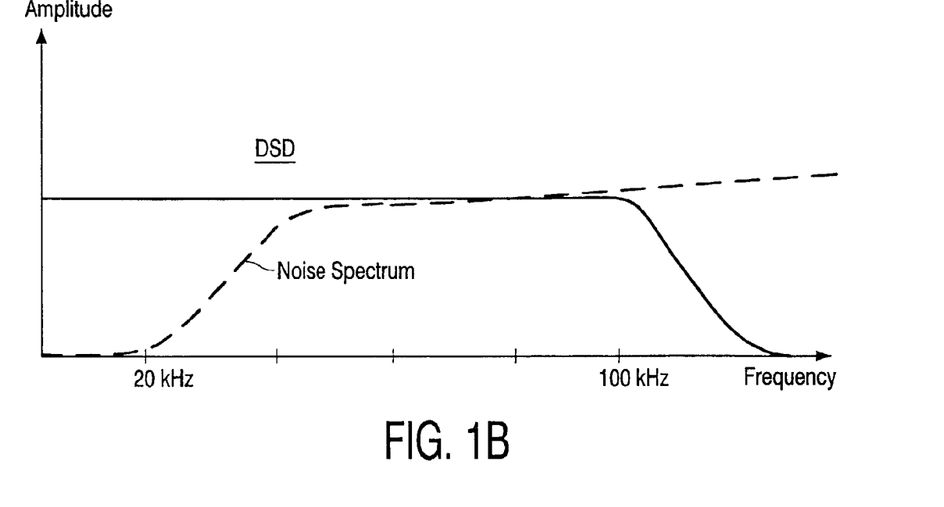
FIG. 1B illustrates the audio and noise spectrum of a DSD signal.

DSD avoids the degradation in signal quality that may result from the decimation process and interpolation processes used in PCM. DSD recordings have an improved frequency response, which is broadened to 100 kHz. In addition, the DSD frequency response has a dynamic range of 120 dB when noise shaping filters of fifth (or higher) order are included in the sigma-delta A/D converter. FIG. 1B illustrates the audio spectrum of DSD signals.

Although human ears generally do not hear distinct tones over 20 kHz, the higher frequencies do contain audio information of a transient nature (i.e., the way sounds start and stop), which is perceived by the human brain and provides a more "natural" feeling to the music. By preserving the information in this high-frequency band (i.e., in the noise spectrum), DSD technology provides a more accurate impulse response and sharp transients, which is a significant reason for the superior audio quality of DSD recordings over the standard CD recordings.

Along with audio quality, another important issue that must be considered with respect to digital recording technologies is protection of the recorded content from illegal copying and distribution. One mechanism for protecting digitally recorded intellectual property (IP) is an encoded watermark.

A watermark comprises identification data embedded within digital content, which may specify the ownership and the intended recipient of the content, and help enforce restrictions on usage (e.g., copying and distribution) of the content. Watermarks can be used to identify illegal copies of digital content, detect illegal changes in the content.

Some watermarks are used as an attempt to prevent unlawful copying and distribution of digital IP. For instance, certain types of CD recorders may contain a special copy protection mechanism, which checks for a watermark within the content to be recorded. If a watermark is detected that indicates that the copying is not permitted or that the content has been illegally obtained, the mechanism disables the recording operation of the device.

Alternatively, the purpose of a watermark may be to identify the unlawful copying and distribution of content, in order to allow the rights owners to seek legal reparations from the infringing parties.

A watermark generally comprises a signal encoded into digital content that fulfills certain statistical properties, such that it can be extracted from the content in its original form. However, the addition of such a signal usually causes some degradation to the sound quality of digitally recorded audio signal. It would be advantageous to provide a watermark, whose presence does not cause any perceivable degradation in the sound quality of an audio recording.

It would further be advantageous to provide a watermark that is robust, i.e., difficult to remove or modify without severely affecting the quality of the audio signal in which it is embedded. Accordingly, the watermark must be placed in perceptually significant components (e.g., frequency bands) of the audio signal.

SUMMARY OF THE INVENTION

The present invention provides a robust watermark for audio signals recorded in DSD format, which does not cause a significant degradation of the audio quality.

An exemplary embodiment of the present invention is directed to a robust watermark embedded into a DSD audio signal, such that the watermark has a flat frequency spectrum in a specific frequency range that is above 20 kHz. The frequency response of the watermark is substantially zero at the band of frequencies below 20 kHz.

In a further exemplary embodiment of the present invention, the specific frequency range of the watermark does not extend above 100 kHz.

In a further exemplary embodiment of the present invention, spread-spectrum watermarking is used to encode the robust watermark into the DSD audio signal.

In a further exemplary embodiment of the present invention, the specific frequency range of the robust watermark is chosen to be low, such that the watermark is placed in a perceptually more significant frequency band and removal of the watermark will result in significant degradation of the audio quality.

In a further exemplary embodiment of the present invention, the specific frequency range of the robust watermark is chosen to be high, such that the degradation of audio signal caused by the presence of the watermark is low.

Advantages of the present invention will become more apparent from the detailed description provided hereafter. However, it should be understood that the detailed description and specific examples, while indicating preferred embodiments of the present invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given below and the accompanying drawings, which are given for purposes of illustration only, and thus do not limit the invention.

DETAILED DESCRIPTION OF THE EXEMPLARY EMBODIMENTS

The present invention provides a watermark, encoded into a specific frequency band of a DSD audio signal, which preferably does not extend below 20 kHz or above 100 kHz. Since the human ear does not normally perceive harmonics above 20 kHz, the digital watermark does not degrade the sound quality of the recording by any significant amount. However, any efforts by individuals to remove this watermark by low-pass filtering the recorded signals above 20 kHz will result in significant degradation, such that the sound quality of the DSD recording will be no better than standard CD recordings.

Figure 2A:
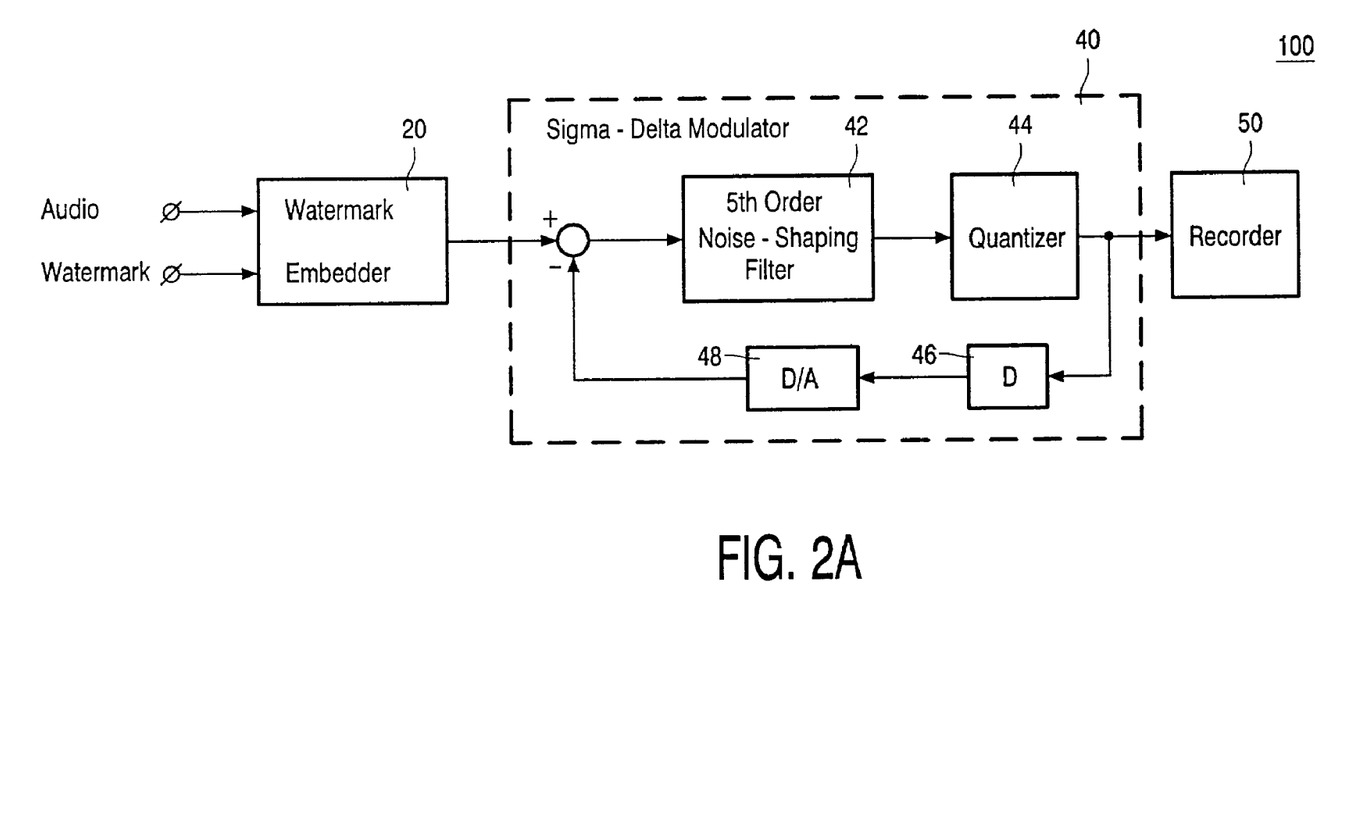
FIG. 2A is a block diagram of a DSD signal recording apparatus according to an exemplary embodiment where an analog watermark signal is embedded into an analog audio signal, prior to the encoding of the audio signal into a DSD signal.

FIG. 2A is a block diagram of a DSD signal recording apparatus 100 according to an exemplary embodiment where an analog watermark signal is embedded into an analog audio signal, prior to the encoding of the audio signal into a DSD signal. In the recording apparatus of FIG. 2A, an analog audio signal and an analog watermark signal is input to a watermark embedder 20. The output of the watermark embedder 20 is connected to a sigma-delta modulator 40. The output of the sigma-delta modulator 40 is sent to a DSD signal recorder 50.

The operation of the DSD signal recording apparatus 100 of FIG. 2A is as follows. The watermark embedder 20 inserts the watermark signal into the audio signal in a specific frequency range. According to an exemplary embodiment, this range is chosen such that the lower frequency limit does not extend below approximately 20 kHz and that the higher frequency limit does not extend higher than approximately 100 kHz. According to alternative embodiments, however, that the lower limit of the frequency range can be set below 20 kHz in order to obtain a more robust watermark at the expense of sound quality. A more detailed description of an exemplary watermark embedder 20 will be given below in connection with FIG. 3.

The watermarked signal output from the watermark embedder 20 is sent to a sigma-delta modulator 40, which quantizes the watermarked signal into a 1-bit DSD encoded signal. The sigma-delta modulator 40 uses a negative feedback loop to accumulate the DSD encoded bitstream. The accumulated signal is sent to a fifth-order noise-shaping filter. The output of this filter 42 is quantized into a "1" or "0" by quantizer 44. The 1-bit output of quantizer 44 is looped back via a one-sample delay unit 46 and a digital to analog signal converter 48. The bitstream output of the sigma-delta modulator is recorded by the DSD signal recording apparatus 50, for example, on a SACD disk.

Figure 2B:
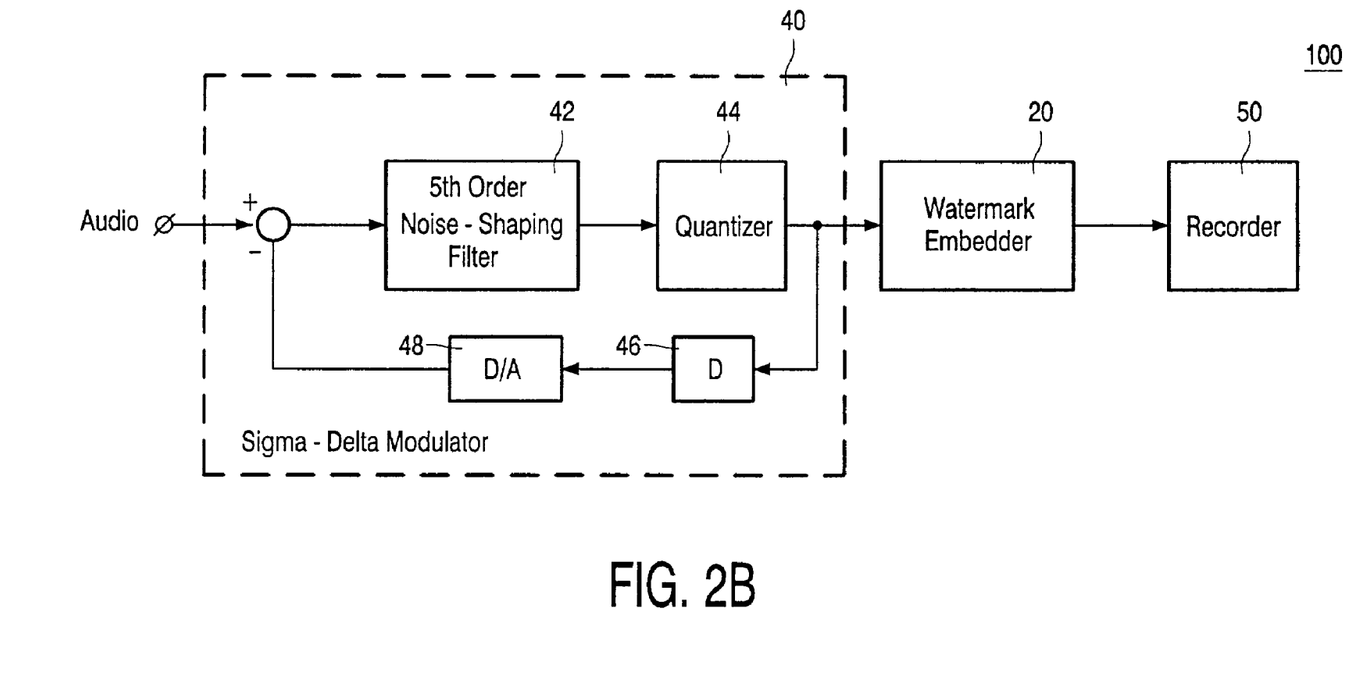
FIG. 2B is a block diagram of a DSD signal recording apparatus according to an exemplary embodiment where a digital watermark signal is embedded into a DSD encoded audio signal.

According to an alternative exemplary embodiment, the recording apparatus 100 may first encode the analog audio signal into a DSD signal before inserting the watermark. FIG. 2B is a block diagram of a DSD signal recording apparatus according to this alternative exemplary embodiment.

In FIG. 2B, the analog audio signal is inserted into a sigma-delta modulator 40. The DSD encoded signal output from the sigma-delta modulator 40 is input into the watermark embedder 20, whose output is connected to DSD signal recorder 50. In the recording apparatus of FIG. 2B, the watermark comprises a bit pattern which is encoded into a specific frequency band of the DSD audio signal, where the specific frequency band does not substantially extend below 20 kHz or above 100 kHz.

According to an exemplary embodiment, the watermark is inserted into the DSD signals through a process called Spread Spectrum Watermarking (SSW). This process is analogous to spread spectrum wireless communications, in which a narrowband signal is transmitted over a much larger bandwidth such that the energy in any single frequency is undetectable. The SSW process spreads the watermark signal across a wide frequency band of the digital content, where the frequency band is perceptually significant.

When applying a watermark to an audio signal, the SSW process spreads the watermark over frequency components that contribute to the overall sound quality of the signal. Since the watermark is hidden across a much wider frequency band than is needed, it will take the form of a relatively weak noise in the content that is virtually undetectable by individuals wishing to remove the watermark. Therefore, the only way that the watermark can be removed is by filtering out the significant frequency components of an audio signal, and thereby causing noticeable degradation to the sound quality. Accordingly, the watermark of the SSW process can be very robust.

In spread spectrum watermarking, the watermark signal is inserted into the audio signal using a select set of frequency sub-bands, within the given frequency range for the watermark. Using a scheme known as frequency hopping, the frequency sub-band of the watermark changes abruptly, many times each second. In this scheme, the watermark signal may be modulated with a generated pseudo-noise signal and then scaled to a relatively low power level.

Since the frequency sub-band of the watermark at each point in time is determined pseudo-randomly, it appears in the frequency domain as a weak noise. However, the watermark verification process knows all of the frequency sub-bands where the watermark is embedded, such that it is possible to combine these relatively weak signals into a single signal with a high Signal to Noise Ratio (SNR). The combined signal can then be verified by examining its content.

Figure 3:
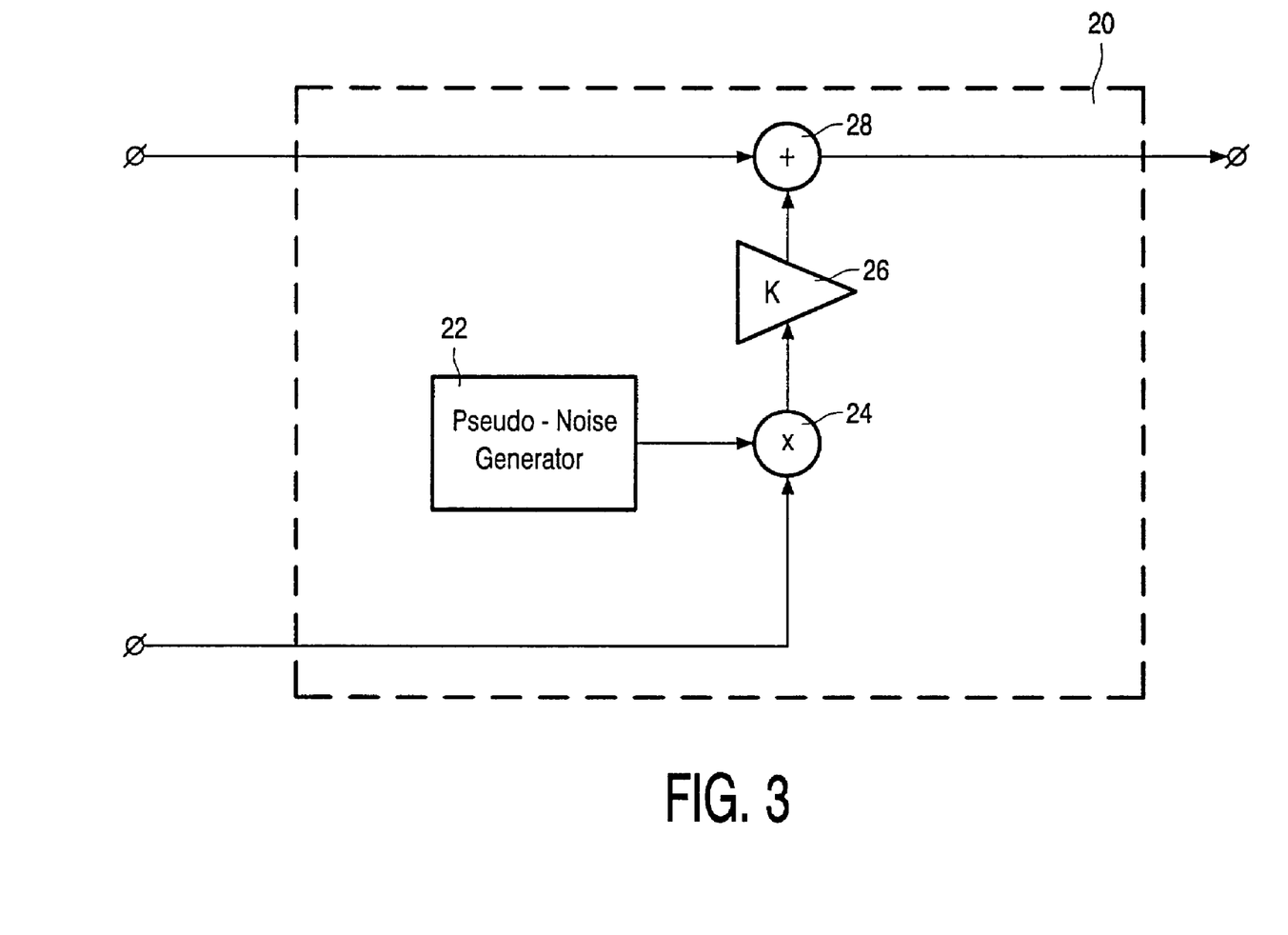
FIG. 3 is a block diagram of a watermark embedder illustrating an exemplary embodiment where the SSW technique is used to embed a robust watermark into an audio signal.

FIG. 3 illustrates a watermark embedder 20, which embeds a robust watermark into an audio signal using the SSW process. A modulator 24 modulates the watermark with a pseudo-noise signal generated by the pseudo-noise generator 22. According to an exemplary embodiment of the present invention, the pseudo-noise signal is generated such that it spreads the watermark within a specific frequency range that does not extend substantially below 20 kHz or substantially above 100 kHz. The modulated watermark signal is passed through amplifier 26 where it is scaled to the appropriate level. The signal is then combined with the input audio signal using addition element 28, resulting in a watermarked audio signal.

Should the watermark embedder 20 of FIG. 3 be used in connection with the recording apparatus of FIG. 2A, the input audio signal and the watermark signal would then comprise analog signals. Alternatively, if the watermark embedder 20 of FIG. 3 is to be used in conjunction with the recording apparatus of FIG. 2B, then the input audio signal comprises a DSD encoded signal and the watermark comprises a digital bit pattern.

It should be noted that other SSW methods, including sub-band decomposition watermarking techniques, could be used to insert the watermark in the DSD signal. In addition, the present invention is in no way limited to using the spread spectrum watermarking process to watermark the audio signal. Other methods for encoding a watermark into a specific frequency range of a DSD audio signal may also be used, as will be contemplated by those of ordinary skill in the art.

Figure 4A:
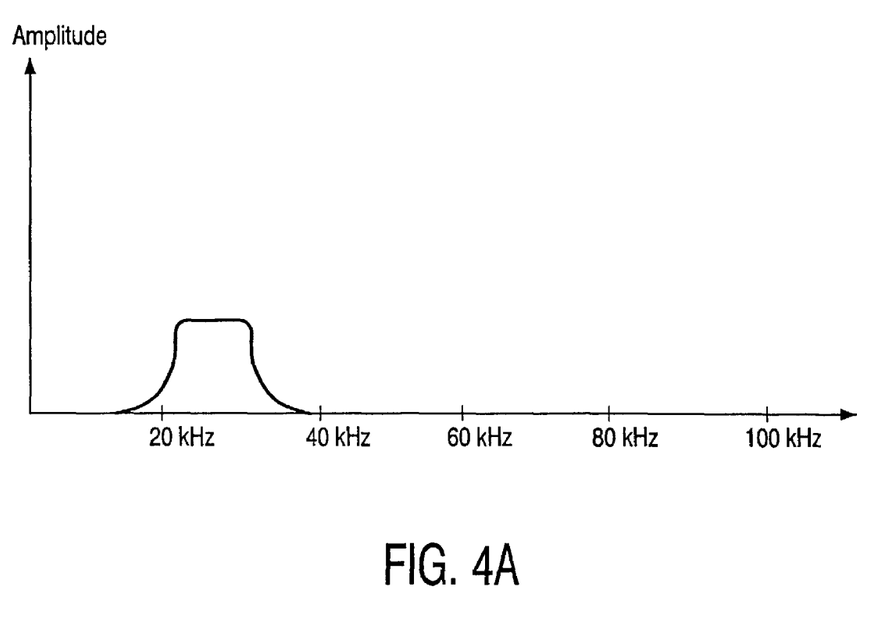
FIG. 4A illustrates the spectrum of a robust watermark whose frequency band is chosen for greater robustness.

According to an exemplary embodiment of the present invention, the specific frequency range in which the watermark is embedded into the DSD signal is chosen to be rather low. For example, the frequency range may configured to be approximately between 20 and 30 kHz. FIG. 4A illustrates the frequency spectrum of a watermark at such a frequency range. Any attempts to remove this watermark by low-pass filtering will result in a noticeable degradation in the audio quality of the DSD signal. This is because the low-pass filtering will remove all transient information from the audio signal at the frequency components above 20 kHz. Also, low-pass filtering the audio signal at a cutoff frequency of 20 kHz may further result in a blocking of harmonics that can be perceived by a listener.

As discussed earlier, if all signals above 20 kHz were removed from a DSD recording by low-pass filtering, the sound quality of the resultant signal would be no better than the standard CD recordings. Accordingly, it would not be worth the effort for to illegally remove the watermark and make copies of a SACD disk recording, since the copies will not come close to matching the quality standards of SACD.

Although this embodiment has been described with respect to a digital watermark whose frequency range is between about 20 and 30 kHz, it should be noted that this range is merely exemplary of the general principle that digital watermarks having a lower given frequency range will result in much greater degradation to the DSD audio signal if they are removed.

There is a disadvantage, however, in choosing a low frequency range for the watermark. Specifically, the mere presence of such a watermark in the DSD signal causes some degradation to the sound quality. In the discussion above with respect to SSW process, it was noted that the watermark takes the form of noise in the audio signal. Such noise may affect the audio quality, even if its frequency range is a little bit above 20 kHz.

Figure 4B:
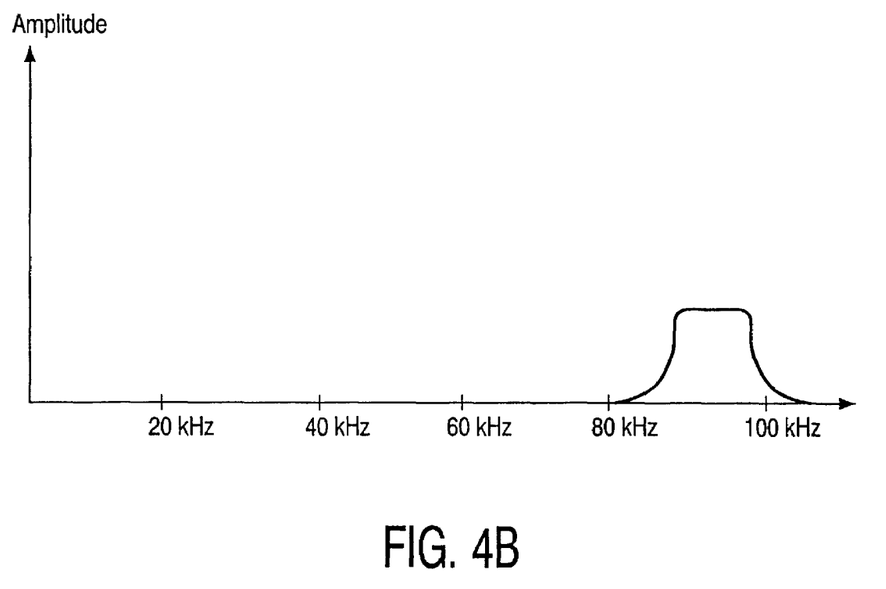
FIG. 4B illustrates the spectrum of a robust watermark whose frequency band is chosen for lower degradation of sound quality.

According to another exemplary embodiment of the present invention, the frequency range of the watermark is chosen to be at a high frequency range, such that its presence does not adversely affect the DSD signal. FIG. 4B illustrates an example of a digital watermark whose frequency range is approximately between 90 and 100 kHz. Since the transient information at the frequency components closer to 100 kHz is not as easily perceived by a listener, the degradation caused by a watermark inserted in this frequency range is not at all significant.

Accordingly, the example of FIG. 4B is illustrative of the general principle of this embodiment, namely, that a watermark inserted in a higher frequency range of a DSD signal causes less degradation to the sound quality. However, using a high frequency watermark does have the disadvantage that it can be removed by low-pass filtering the DSD signal with a higher cutoff frequency, resulting in less degradation to the signal. According to a further embodiment of the present invention, a robust watermark, as described with respect to the embodiments above, may be embedded in a DSD audio signal, which also contains a soft watermark.

The concept of soft watermarking is described in U.S. Pat. No. 6,157,330, the subject matter of which is herein incorporated by reference. A soft watermark can be inserted into the DSD signal by replacing selected bits of the output bitstream with bits of a watermark pattern.

Figure 5:
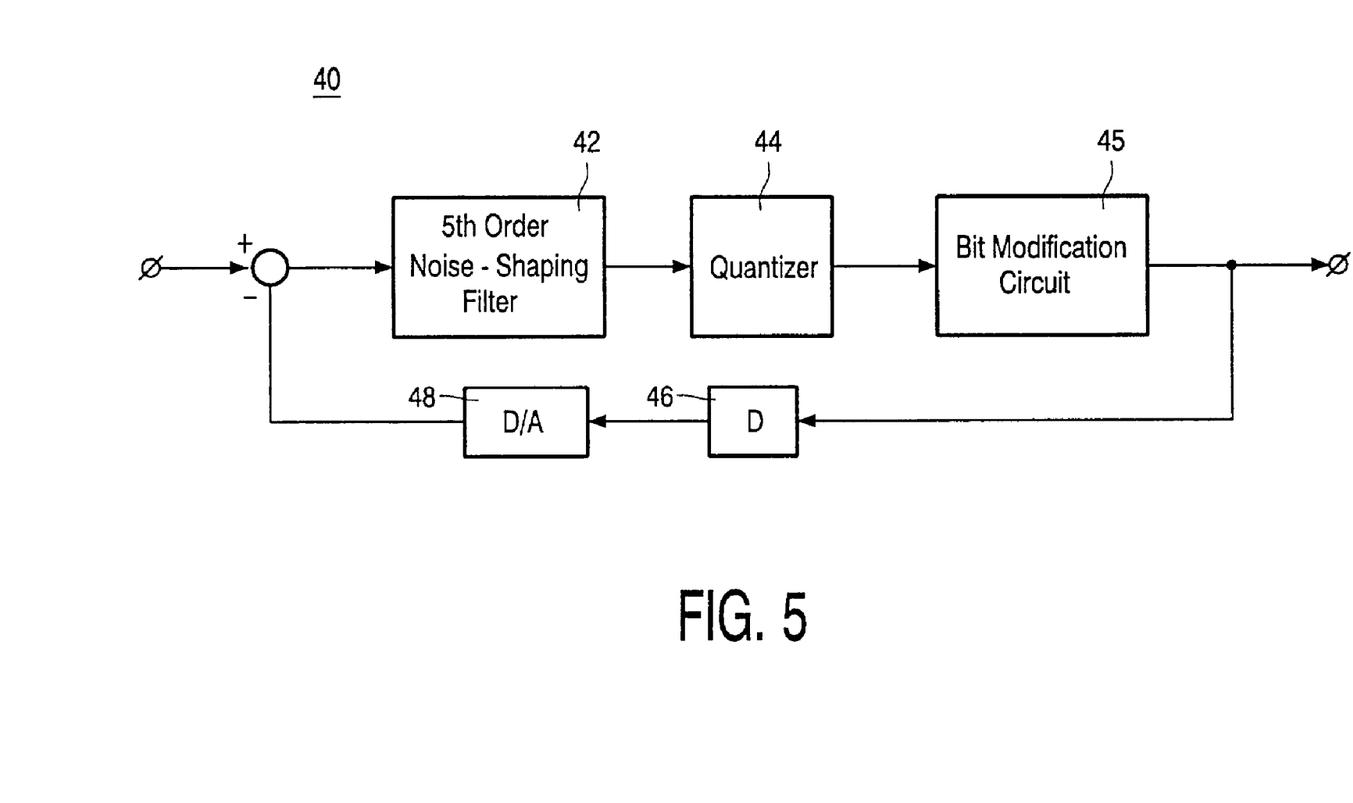
FIG. 5 illustrates a sigma-delta modulator according to an exemplary embodiment in which a soft watermark is inserted the DSD signal.

For instance, the sigma-delta modulator 40 illustrated in FIG. 5 may be used to insert a soft watermark into the DSD signal. This sigma-delta modulator 40 includes a bit modification circuit 45 for receiving the bits output from the quantizer 44. The function of the quantizer 44 is to quantize the output of the fifth-order noise shaping filter into "1"s and "0"s. The bit modification circuit 45 may be configured to replace selected bits output from the quantizer 44, e.g., every $100^{th}$ bit, with bits corresponding to a bit pattern of the soft watermark.

Alternatively, the soft watermark data may be represented by the number of bit periods between successive inverted bits. Thus, the bit modification circuit 45 may be configured to invert selected bits in the quantized bitstream.

The insertion of a soft watermark results in a mere 1 dB increase of quantization noise, which is not audible in the 120 dB dynamic range of the DSD signal. While soft watermarks do not degrade the audio quality by any significant amount, they are easily removed from a DSD signal by almost any type of signal processing. Therefore, soft watermarks are not considered robust. However, such watermarks may still be useful, because the absence of a soft watermark in a DSD recording indicates that the audio signal is a copy.

Accordingly, a soft watermark may be used in combination with a robust watermark, which is embedded in the DSD signal. A verification process can be used to determine whether the soft watermark is missing from the DSD content, i.e., whether the content has been copied. If so, the robust watermark can be used to identify the owner or rights holder of the content, so that legal restitution can be made.

The above embodiments have been described with respect to a digital watermark embedded in a frequency range of a DSD signal that does not extend substantially below 20 kHz or substantially above 100 kHz. However, a watermark may be inserted in a frequency range that extends below 20 kHz or above 100 kHz and not depart from the spirit and scope of the invention. For example, the watermark may be inserted in frequency components of the audio signal well below 20 kHz, at such short and infrequent intervals that it is not audible to a listener.

The present invention has been described with reference to the exemplary embodiments. As will be evident to those of ordinary skill in the art, various modifications of this invention can be made in light of the foregoing disclosure without departing from the spirit and scope of the claims.

The invention claimed is:

1. A method comprising:

inserting a watermark into a Direct Stream Digital (DSD) signal to create a watermarked signal, wherein said inserted watermark is spread across a portion of a frequency range of said DSD watermarked signal and does not extend substantially within human hearing perception of distinct tones.

2. The method of claim 1, wherein said portion of frequency range does not extend substantially below 20 kHz and does not extend substantially above 100 kHz.

3. The method of claim 1, wherein said inserting step is performed using a spread spectrum watermarking process.

4. The method of claim 1, wherein prior to said inserting step, a soft watermark is inserted into said DSD signal by replacing selected bits of said DSD signal with bits corresponding to soft watermark data.

5. A method comprising:

inserting a watermark into an analog signal to create a watermarked signal, said inserted watermark being spread across a frequency range that does extend substantially within human hearing perception of distinct tones of said watermarked signal;

converting said watermarked signal into a Direct Stream Digital (DSD) signal.

6. A recording apparatus (100) comprising:

a modulator (40) for converting an input signal into a Direct Stream Digital (DSD) signal;

a watermark embedder (20) for embedding a watermark into said DSD signal and outputting a watermarked signal, such that said watermark is spread across a frequency range and does not extend substantially within human hearing perception of distinct tones of said watermarked signal; and a recorder (50) for recording said watermarked signal on a storage medium.

7. The recording apparatus (100) of claim 6, wherein said watermark embedder (20) utilizes a spread spectrum watermarking (SSW) technique, said watermark embedder (20) further comprising a pseudo noise generator (22) for generating pseudo noise;

a modulator (24) for modulating said watermark with said pseudo noise to generate a modulated watermark signal;

an amplifier (26) for scaling the modulated watermark signal; and an addition element (28) for combining the DSD signal with the scaled modulated watermark signal.

8. A recording apparatus (100) comprising:

a watermark embedder (20) for embedding a watermark into an analog signal and outputting a watermarked signal, such that said watermark is spread across a frequency range and does not extend substantially within human hearing perception of distinct tones of said watermarked signal;

a modulator (40) for converting said watermarked signal into a Direct Stream Digital (DSD) signal; and a recorder (50) for recording said DSD signal on a storage medium.

* * * * *